(12) United States Patent
Faldt

(10) Patent No.: US 10,959,423 B2
(45) Date of Patent: Mar. 30, 2021

(54) PRODUCT AND METHOD FOR CELL PRESERVATION

(71) Applicant: Cytiva Sweden AB, Uppsala (SE)

(72) Inventor: Eric Faldt, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 0 days.

(21) Appl. No.: 15/125,871

(22) PCT Filed: Feb. 19, 2015

(86) PCT No.: PCT/SE2015/050192
§ 371 (c)(1),
(2) Date: Sep. 13, 2016

(87) PCT Pub. No.: WO2015/152788
PCT Pub. Date: Oct. 8, 2015

(65) Prior Publication Data
US 2017/0013825 A1    Jan. 19, 2017

(30) Foreign Application Priority Data

Mar. 31, 2014   (SE) .................................. 1450373-4

(51) Int. Cl.
*A01N 1/02* (2006.01)
*G01N 1/42* (2006.01)
*B01L 3/00* (2006.01)
*F25D 3/08* (2006.01)

(52) U.S. Cl.
CPC ........... *A01N 1/021* (2013.01); *A01N 1/0268* (2013.01); *B01L 3/50825* (2013.01); *F25D 3/08* (2013.01); *B01L 2200/141* (2013.01); *B01L 2300/042* (2013.01); *B01L 2300/044* (2013.01); *B01L 2300/0832* (2013.01); *F25D 2303/0842* (2013.01); *G01N 1/42* (2013.01)

(58) Field of Classification Search
CPC ........ A01N 1/021; A01N 1/0268; G01N 1/42; B01L 3/0289; B01L 3/50825; B01L 2200/141
See application file for complete search history.

(56) References Cited

U.S. PATENT DOCUMENTS

| | | | | |
|---|---|---|---|---|
| 5,296,197 A | * | 3/1994 | Newberg | F16K 41/103 137/240 |
| 5,752,936 A | * | 5/1998 | Chen | A61B 5/15003 600/576 |
| 8,240,717 B2 | | 8/2012 | Freter | |
| 9,375,168 B2 | | 6/2016 | Shacham | |
| 9,381,134 B2 | | 7/2016 | Rettinghaus et al. | |
| 2002/0055166 A1 | * | 5/2002 | Cannon | C12M 23/42 435/286.5 |
| 2005/0245899 A1 | | 11/2005 | Swisher | |

FOREIGN PATENT DOCUMENTS

| | | |
|---|---|---|
| CN | 102742568 A | 10/2012 |
| CN | 202723863 U | 2/2013 |
| DE | 10243129 A1 | 4/2004 |
| EP | 1413874 A1 | 4/2004 |
| EP | 2111795 A1 | 10/2009 |
| EP | 3125687 A1 | 2/2017 |
| WO | 90/09431 A1 | 8/1990 |
| WO | 2010/108091 A2 | 9/2010 |
| WO | 2015/152788 A1 | 10/2015 |

OTHER PUBLICATIONS

Zuckerman "Propagation of Parasitic Protozoa in Tissue Culture and Avian Embryos" (1966), Annals of NY Academy of Sciences, vol. 139: 24-38. (Year: 1966).*
Hubalek "Protectants used in the cryopreservation of microorganisms" (2003) Cryobiology, vol. 46: 205-229. (Year: 2003).*
Fan et al. "Transgenic rabbits as therapeutic protien bioreactors and human disease models", 2003, Pharmacology & Therapeutics, vol. 99: 261-282 (Year: 2003).*
Ochieng A. and Gray M.A., "Establishment of Cultures of Trypanosome Congolense from Infected Cattle", Recent Advances in Medical Research with a Symposium on Environmental and Occupational Health, Proceedings of the 10th Annual Medical Scientific Conference, KEMRI/KETRI, Nairobi, Kenya, 1989, pp. 73-76; the abstract; sections "Ampoules for collection of infected blood", "Collection of blood from infected cattle in the field" and "Cryopreservation".
Gray M. A. et al., "Drug sensitivity screening in vitro of populations of trypanosoma congolense originating from cattle and tsetse flies at Nguruman, Kenya", Acta Tropica, 1993, vol. 55, pp. 1-9; section "Collection of trypanosomes from infected cattle".
Clincke M-F. et al, "Very High Density of Chinese Hamster Ovary Cells in Perfusion by Alternating Tangential Flow or Tangential Flow Filtration in WAVE Bioreactors(TM)—Part II: Applications for Antibody Production and Cryopreservation", Biotechnol. Prog., 2013, vol. 29, pp. 768-777.
Buravkova L. et al., "Cell-to-cell interactions in changed gravity: Ground-based and flight experiments", Acta Astronautica, 2005, vol. 2005, vol. 57, pp. 67-74.
International Search Report and Written Opinion regarding International Application No. PCT/SE2015/050192, dated Jun. 9, 2015, 15 pages.
International Preliminary Report on Patentability received for PCT Patent Application No. PCT/SE2015/050192, dated Oct. 4, 2016, 8 pages.
Extended European Search Report received for European Patent Application No. 15773020.1, dated Jan. 3, 2017, 10 pages.
Origen: "CrypPur(TM) Cryopreservation Solutions", available online at <http://www.questbiomedical.com/Content/PDF/Leaflet22.pdf>, Oct. 27, 2010, pp. 1-2.

(Continued)

Primary Examiner — Teresa E Knight
(74) Attorney, Agent, or Firm — Eversheds Sutherland (US) LLP

(57) ABSTRACT

The present invention relates to a product and method for cell preservation, such as cell banking of any type of cells for subsequent scientific or medical use. More closely, the invention relates to a product and a method for cryopreservation of cells using vacuum tubes provided with freeze media/cryopreservation liquid.

18 Claims, 1 Drawing Sheet

(56) References Cited

OTHER PUBLICATIONS bd.com, "Needleless Blood Collection from BD Q-Syte (TM) Luer Access Split Septum", available online at <http://www.bd.com/resource.aspx?IDX=14302>, Dec. 2009, pp. 1-2.
ATCC; Animal Cell Culture Basics:"Animal Cell Culture Guide Tips and Techniques for Continuous Cell lines", available online at <https://www.atcc.org/~/media/AnimCellCulture_Guide.ashx>, Jan. 2012, 40 pages.
TPP:, "Home of Tissue Culture TubeSpin Bioreactor 50 with Septum", available online at <http://www.tpp/ch/page/downloads/data_sheets/80708-TubeSpin50-with-septum-D_E-09-13.pdf>,Sep. 1, 2013.
Office Action for EP Patent Appl. No. 15 773 020.1, dated May 22, 2018, 5 pages.
Paulo S. Monzani et al., "Transgenic Bovine as Bioreactors: Challenges and Perspectives," Bioengineered, vol. 7, No. 3, Apr. 8, 2016, pp. 123-131.
Office Action for EP Patent Appl. No. 15 773 020.1, dated May 15, 2019, 12 pages.
Chinese Office Action for CN Application 201580017762.5 dated Aug. 17, 2020 (14 pages with English translation).

\* cited by examiner

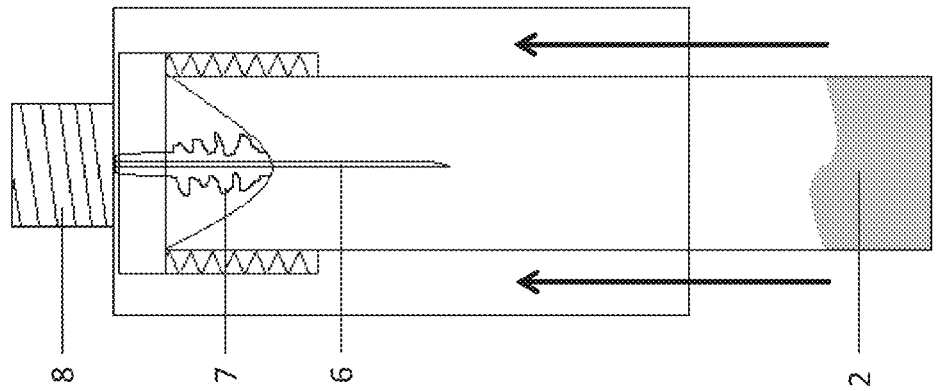
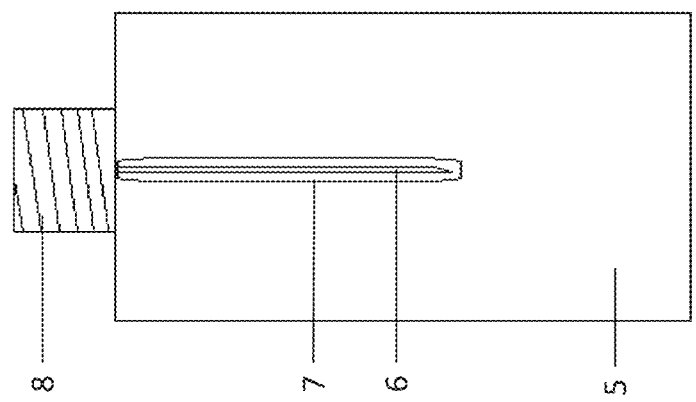
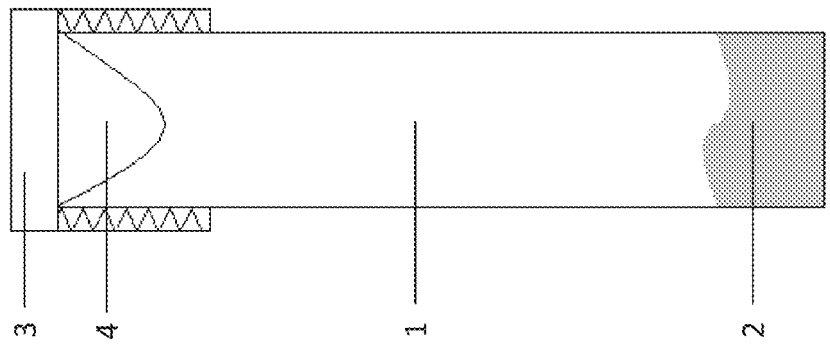

PRODUCT AND METHOD FOR CELL PRESERVATION

CROSS-REFERENCE TO RELATED APPLICATIONS

This application is a filing under 35 U.S.C. 371 of international application number PCT/SE2015/050192, filed Feb. 19, 2015, which claims priority to SE application number 1450373-4, filed Mar. 31, 2014, the entire disclosures of each of which are hereby incorporated by reference.

FIELD OF THE INVENTION

The present invention relates to a product and method for cell preservation, such as cell banking of any type of cells for subsequent scientific or medical use. More closely, the invention relates to a product and a method for cryopreservation of cells using vacuum tubes provided with freeze media/cryopreservation liquid.

BACKGROUND OF THE INVENTION

Today several cell banks exist which store cells, for example human placental or umbilical cord stem cells, for future medical use. There are also cell banks which store cells, cultivated in for example bioreactors, for scientific purposes. Common for all cell banks is that the cells are stored by cryopreservation usually in liquid nitrogen at −196° C.

Cryopreservation is a very manual and time consuming task usually performed under laminar air flow (LAF). Furthermore, it includes several steps with open handling which increases the risk of contamination. Due to the number of steps during traditional cell banking, batch to batch variations might also occur. During cryopreservation of cells, time and temperature are critical factors to eliminate stress such as asphyxiation.

Containers under vacuum, such as the Vacutainer™, are well-established products used at hospitals and care centers for rapid blood sampling. The containers comprise a vacuum tube that aseptically draws blood through a sleeved covered needle. The vacuum tube is available in various volumes and often pre-coated with various compounds to prevent for example blood clotting. The vacuum tube is inserted into the access device and when the sleeve protected needle penetrates the silicon cap on the vacuum tube the blood automatically will be withdrawn from the patient.

It would be desirable to have a product with which cell banking could be performed without bringing the cells out of the bioreactor and which significantly would shorten the time from bioreactor to the fridge. This would provide a powerful tool to establish large cell banks with very little effort.

SUMMARY OF THE INVENTION

The present invention provides a product and a method for rapid cell banking which reduces possible contamination and handling times and efforts compared to prior art.

Thus in a first aspect the invention relates to a product for cryopreservation of cells, comprising a vacuum tube provided with freeze media, and a penetratable and preferably removable cap on said tube.

Preferably the freeze media is DMSO, glycerol or methyl cellulose and the vacuum tube is filled with 5-20% v/v, preferably 10% v/v freeze media.

In one embodiment an access device is provided for receiving said vacuum tube. The access device is provided with a hollow needle to be inserted into the vacuum tube and also provided with a connector for connection to a cell source, such as a cell culture in a bioreactor.

In a second aspect, the invention relates to a method for cryopreservation of cells, comprising sampling or harvesting cells into a vacuum tube provided with freeze media; closing said tube with a penetratable cap; and freezing said tube.

In a preferred method for cryopreservation of cells, the method comprises cultivating cells in a bioreactor; harvesting or sampling cells from said bioreactor into a vacuum tube provided with freeze media, wherein the cells are instantly mixed with the freeze media; removing said tube from said bioreactor; and freezing said tube and its content.

Preferably the freeze media is DMSO, glycerol or methyl cellulose and the vacuum tube is filled with 5-20% v/v, preferably 10% v/v freeze media.

In a preferred embodiment, the cells are cultivated as a perfusion culture. Preferably the cells are cultivated to 10-200 MVC/mL.

If desired the cells are incubated before freezing.

One or more steps of the method may be automated.

The method of the invention would nearly eliminate the time from cell harvesting to cryopreservation, since it will be done in one step. Preferably, the cryopreservation tubes are stored cold before the procedure starts.

BRIEF DESCRIPTION OF THE DRAWINGS

FIG. 1A shows a schematic view of a vacuum tube prepared with concentrated cryopreservation liquid.

FIG. 1B shows a schematic view of an access device for receiving the vacuum tube and having a needle for penetrating the lid of the vacuum tube.

FIG. 1C shows a schematic view of the access device connected to the vacuum tube and ready to be inserted to the bioreactor for cell sampling.

DETAILED DESCRIPTION OF THE INVENTION

The present invention will now be described in relation to a non-limiting example and the accompanying figure.

FIG. 1A shows a schematic view of a vacuum tube (1) prepared with concentrated cryopreservation liquid (2). The tube is also provided with a penetratable and removable cap (3) and penetratable septum (4) of silicon or other soft material. The tube may be any vessel appropriate for cryo preservation applied with vacuum, for example tubes may be of glass or plastic.

FIG. 1B shows a schematic view of an access device (5) comprising a protective housing (5) for receiving the vacuum tube and having a needle (6) for penetrating the lid of the vacuum tube. The needle is provided with a protective sleeve (7) of rubber or silicon. The access device is provided with a Luer or other connection to a bioreactor for cell sampling directly into the vacuum tube.

FIG. 1C shows a schematic view of the access device (5) connected to the vacuum tube (1) and ready to be inserted to the bioreactor via the connection (8) for cell sampling. The cryo vessel is pushed into the protective cap (3) along the direction of the arrows. The needle will penetrate the soft material septum. The vacuum will withdraw the cell broth from the bioreactor for mixing directly with the cryopreservation liquid (freeze media). Thereafter, the tube is placed in a fridge for cell banking.

Example

Conventional 5 ml vacuum tubes are filled with 0.5 ml concentrated DMSO (freeze media) using a syringe. A CHO (Chinese Hamster Ovary) culture is brought to up to 10-100 MVC/mL, preferably using perfusion culture. The access device with sleeve protected needle (6) is attached to the bioreactor via the connector (8). Cryo-liquid prepared vacuum tubes according to the invention are used to draw cell samples from the bioreactor. The vacuum tubes are inserted in the access device and the vacuum draws the cells broth into the tube through the needle of the access device. The cell broth and the freeze media are instantly mixed.

Thereafter the filled cryo prepared vacuum tubes are directly transferred to a cell banking fridge. If necessary, the cells in the tubes are shortly incubated before freezing.

The procedure to draw cell samples from bioreactors does not damage the cells and is very fast which enables production of large cell banks with minimum of open handling. If desired, the process may be automated.

The invention claimed is:

1. A method for cryopreservation of cells from a bioreactor, the method comprising,
    cultivating the cells in the bioreactor as a perfusion culture to 10-200 MVC/mL,
    providing an access device having a needleless connector configured for forming a needleless connection to the bioreactor;
    using the needleless connector of the access device to form a needleless connection with the bioreactor containing the cells to access the cells;
    sampling or harvesting the cells from the device into a vacuum tube provided with freeze media by connecting the vacuum tube with the access device such that the cells are instantly mixed with the freeze media; and
    freezing said vacuum tube for cryopreservation of the cells.

2. The method according to claim 1, further comprising adding a freeze media into an empty vacuum tube to form the vacuum tube provided with freeze media.

3. The method according to claim 1, wherein the freeze media is DMSO, glycerol or methyl cellulose.

4. The method according to claim 1, wherein the vacuum tube is filled with 5-20% v/v of freeze media.

5. The method according to claim 1, wherein one or more steps of the method are automated.

6. The method according to claim 1, further comprising incubating the cells mixed with the freeze media in the vacuum tube before freezing.

7. The method according to claim 1, wherein the access device comprises a needle for inserting into the vacuum tube to form the connection between the vacuum tube and the access device.

8. A method for direct cryopreservation of cultivated cells from a bioreactor, the method comprising,
    cultivating the cells in the bioreactor as a perfusion culture to 10-200 MVC/mL,
    providing an access device having a connector configured for forming a needleless connection to a bioreactor and a sleeved needle configured for insertion into a vacuum tube, wherein the connector and the needle are in fluid communication with each other;
    using the connector of the access device to form a needleless connection with the bioreactor to access the cultivated cells;
    sampling or harvesting the cells from the bioreactor by inserting a vacuum tube provided with 5-20% v/v of DMSO into the needle of the access device such that the cells are instantly mixed with the DMSO; and
    freezing said vacuum tube for cryopreservation of the cells,
    wherein one or more steps of the method are automated.

9. The method according to claim 8, further comprising adding DMSO into an empty vacuum tube to form the vacuum tube provided with 5-20% v/v of DMSO.

10. The method according to claim 8, wherein the vacuum tube is filled with about 10% v/v of DMSO.

11. The method according to claim 8, further comprising incubating the cells mixed with DMSO in the vacuum tube before freezing.

12. The method of claim 8, wherein the connector is a Luer, a fluid fitting used for making leak-free connections between a male-taper fitting and its mating female part.

13. A method for cryopreservation of cells from a bioreactor, the method comprising,
    cultivating cells in the bioreactor as a perfusion culture to 10-200 MVC/mL,
    providing an access device having a needleless connector configured for forming a needleless connection to the bioreactor;
    using the needleless connector of the access device to form a needleless connection with the bioreactor to access the cultivated cells;
    sampling or harvesting the cells from the bioreactor by inserting a vacuum tube provided with 5-20% v/v of freeze media into the access device such that the cells are instantly mixed with the freeze media; and
    freezing said vacuum tube for cryopreservation of the cells.

14. The method according to claim 13, further comprising adding a freeze media into an empty vacuum tube to form the vacuum tube provided with freeze media, wherein the freeze media is DMSO, glycerol or methyl cellulose.

15. The method according to claim 13, wherein one or more steps of the method are automated.

16. The method according to claim 13, further comprising incubating the cells mixed with freeze media in the vacuum tube before freezing.

17. The method according to claim 13, wherein the vacuum tube is filled with about 10% v/v of DMSO.

18. The method according to claim 13, wherein the access device comprises a needle for inserting into the vacuum tube.

* * * * *